Patented Jan. 6, 1942

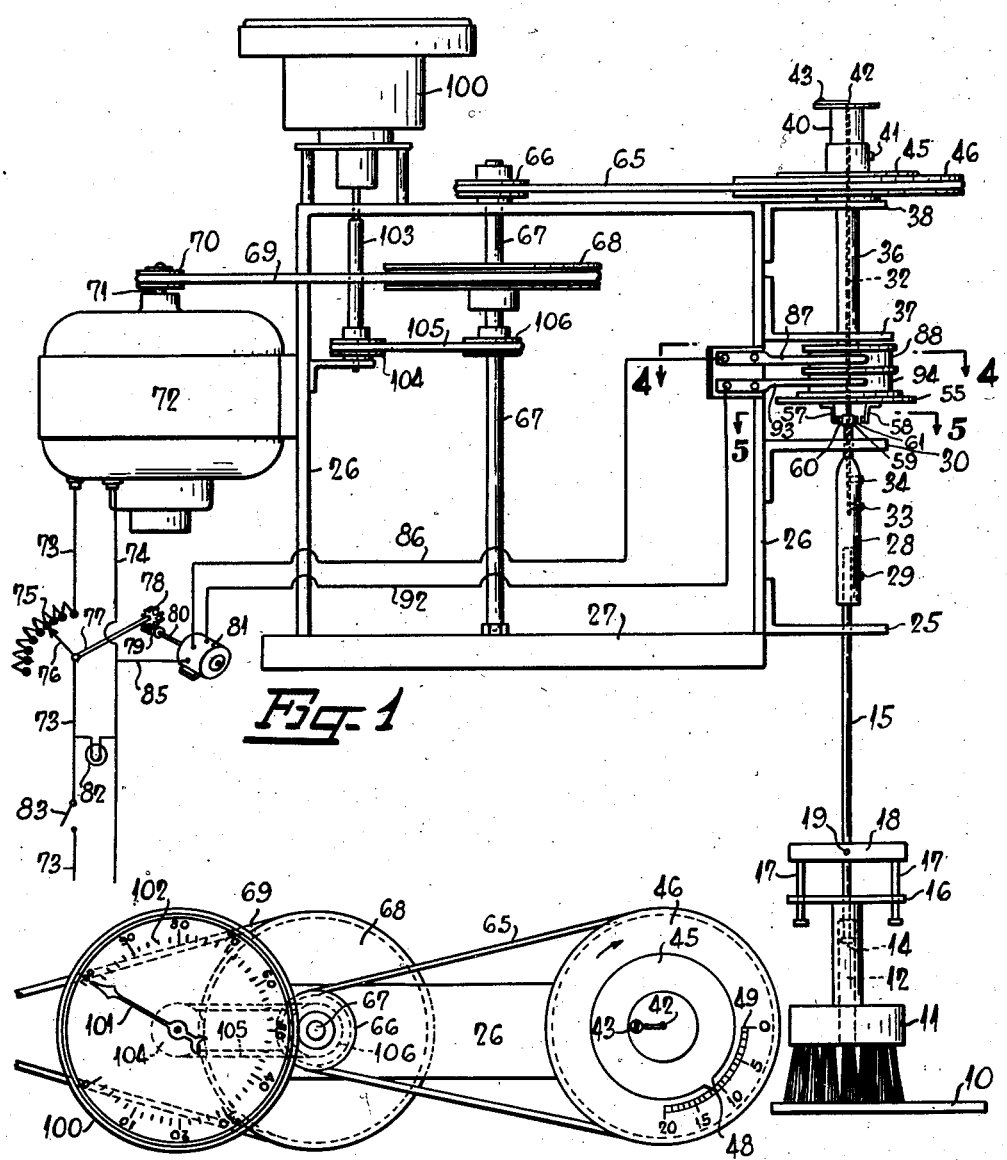

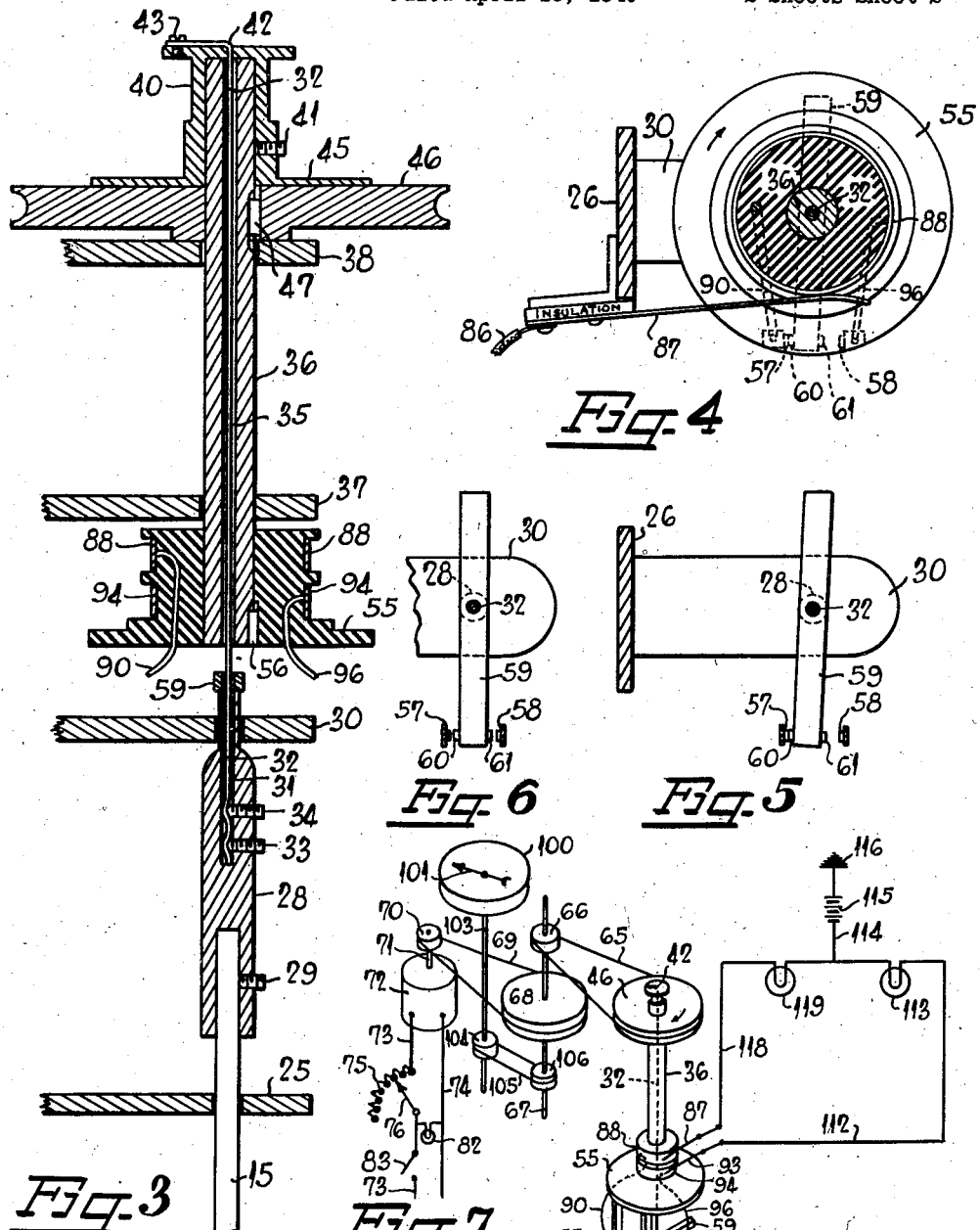

2,269,305

UNITED STATES PATENT OFFICE 2,269,305

DRAG TESTING DEVICE

John M. Bell, Chester, S. C.

Application April 15, 1940, Serial No. 329,664

6 Claims. (Cl. 265—10)

This invention relates to an instrument for testing the drag or resistance offered by surfaces of material such as glass, fabric, floor surfaces, articles of furniture, or in fact any type of material in which it is desired that the smoothness of the surface be uniform. It may also be used for the purpose of testing the consistency or viscosity of fluids, oils and various mixes.

It is an object of this invention to provide a testing device of the class described in which a standardized elongated wire of predetermined length, thickness and resiliency is used to drive, at variable speeds, a rotary testing tool, which testing tool contacts the material to be tested. Means are provided for indicating the torsion produced in this wire thereby ascertaining the amount of drag or resistance offered to the tool. Means are also provided for converting the torsion produced in the wire into terms of revolutions per minute of the rotary testing shaft. For example, where a fluid is flowing from one point to another and it is desired to continuously test it so as to maintain the consistency or drag substantially the same, the testing tool is placed in the line of flow. If the material has the desired consistency or viscosity, a predetermined torsion in the wire will produce a predetermined shaft speed; whereas, if the consistency or viscosity is too high or too low, torsion in the wire will produce correspondingly low and high shaft speeds, respectively.

It is another object of this invention to provide a testing device as above described, which has means for adjusting the initial torsion in the standardized wire, so that the machine can be adapted for use in testing various materials having a wide range of consistency, viscosity or drag.

Some of the objects of the invention having been stated, other objects will appear as the description proceeds when taken in connection with the accompanying drawings, in which—

Figure 1 is a side elevation of the testing device when used in association with a friction testing tool, for testing the surfaces of material;

Figure 2 is a top plan view of the right hand portion of Figure 1;

Figure 3 is an enlarged vertical sectional view taken through the right hand portion of Figure 1;

Figure 4 is a sectional plan view taken along the line 4—4 to Figure 1;

Figure 5 is a sectional plan view taken along the line 5—5 in Figure 1;

Figure 6 is a view similar to Figure 5 but showing the contact arm in a balanced position;

Figure 7 is a diagrammatic view showing the invention as employed when testing the consistency or viscosity of liquids, fluids, mixes and the like and also showing a slightly different indicating mechanism associated therewith.

Referring more specifically to the drawings, the numeral 10 denotes a piece of material which is adapted to have its smoothness tested. A brush or other suitable contacting device 11 is adapted to rest upon this material, which device has a bore 12 therein, said bore being adapted to accommodate the lower enlarged head portion 14 of a vertically disposed shaft 15. The upper portion of the device has a cross arm 16 secured thereto, the ends of which slidably fit around pins 17, said pins 17 projecting downwardly from a cross member 18, which is secured around shaft 15 as at 19. By providing this type of mounting for the brush or device, it is seen that by varying the height or elevation of the material 10 to be tested, the friction due to the weight of the brush or device will not be increased or decreased. Instead, the brush will merely be raised or lowered, thereby causing the bore 12 to move farther upwardly or downwardly relative to portion 14.

The upper portion of the shaft 15 is rotatably mounted in a bracket 25 which extends from the right hand side of framework 26, said framework being supported by a base member 27. The extreme upper end of the shaft 15 is removably secured in a coupling 28 as at 29, and the upper end of this coupling is rotatably mounted in a bracket 30. The coupling 28 has a bore 31 extending downwardly from its upper end, and in this bore the lower end of a standardized member such as a piano wire 32 is adapted to be inserted. Screws 33 and 34 are used for fixedly securing the lower end of this wire within the bore 31.

Wire 32 extends upwardly from the bore 31 and through another bore 35 in shaft 36, said shaft being vertically disposed and rotatably mounted in brackets 37 and 38, which in turn, are supported by the framework 26. Fitting over the upper end of the shaft 36 is a cap 40, said cap 40 being adjustably secured to the shaft by means of a set screw 41. The wire 32 penetrates the cap 40, as at 42 and then proceeds laterally and is secured as at 43 to the upper side of the cap. It will be noted by observing Figure 3 that the wire 32 is unsupported between points 34 and 42. This length of wire between these points will be used as a standard for testing purposes hereinafter to be described.

The cap 40 has a flange 45 integral with the lower side thereof, and this flange fits down upon the upper surface of a pulley 46, said pulley being keyed to the shaft 36 as at 47. By observing Figure 2, it will be seen that the flange 45 has a pointer 48 integral therewith which is adapted to be disposed over a scale 49. This pointer and scale are used to indicate the initial amount of torsion present in the wire 32. If it is desired to vary the initial torsion in the wire, it is only necessary to loosen the screw 41, rotate the cap 40 and the upper end of the wire 32 to the desired position, and then again tighten the screw 41. In Figure 2, the initial torsion in the wire 32 is 11, as indicated by the pointer 48 on the scale 49. This torsion, of course, is present in the wire length between the points 42 and 34 in Figure 3.

The lower end of the shaft 36 has an insulation disk member 55 keyed thereto as at 56. Extending downwardly from the lower face of member 55 (see Figures 1 and 4) are terminals 57 and 58. Between these terminals is the free end of a bar 59, which bar has contacts 60 and 61 on opposed sides thereof, said contacts being adapted, at times, to move into engagement with terminals 57 and 58, respectively. Normally, when the machine is standing still and when there is an initial torsion in the wire which is produced by adjustment of the cap 40 and the screw 41, the contact 60 will move against the contact 57 in the manner shown in Figures 4 and 5. The bar 59 is secured on the upper end of the member 28, and, of course, it is rotated by the lower end of the wire 32.

It is, therefore, seen that when the pulley 46 is rotated in a clockwise manner in Figure 2, that the brush 11 would be rotated solely through the torsion in the length of wire which is disposed between points 34 and 42. When the resistance offered by the surface on the upper side of member 10 becomes sufficiently great to create the necessary torsion to cause the contacts 60 and 61 to become equidistant from the terminals 57 and 58, the surface of the material has the desired smoothness or coefficient of friction.

A belt 65 is mounted upon a wheel or pulley 46. This belt is also mounted upon a smaller pulley 66 on the upper end of the shaft 67, which shaft has its upper end rotatably mounted in framework 26, and its lower end rotatably mounted upon the base portion 27. The intermediate portion of shaft 67 has a pulley 68 secured thereto upon which a belt 69 is mounted. The belt 69 is also mounted upon a motor pulley 70, said pulley being mounted upon motor shaft 71 of motor 72. The motor receives its current from conductors 73 and 74. Conductor 73 has a rheostat 75 therein which is contacted by a rheostat arm 76, said arm being secured to the end of a shaft 77. This shaft has a pinion 78 on its other end which meshes with a worm 79, and this worm is disposed on motor shaft 80 of reversible motor 81. A lamp 82 is placed in parallel between wires 73 and 74 to indicate that current is flowing to motor 72 when switch 83 is closed.

The motor 81 and the rheostat 75 are used to control the speed of the motor 72 which drives the brush 11 through the piano wire 32. In other words, when it is desired to make the machine automatic and when it is desired to indicate continuously the resistance offered by the surface to the rotation of the brush in terms of the shaft speed, it is necessary to provide means for slowing down or speeding up the motor 72 as the resistance to the rotation of brush 11 is increased or decreased respectively, on account of the surface being progressively tested. Of course, as the resistance offered to the brush by the surface is increased beyond the desired limit, the torsion in the wire will be increased and the contact 61 will engage terminal 58. It will then be necessary to reduce the speed of motor 72 to cause the contacts to again be balanced as shown in Figure 6.

The means for effecting this automatic control of the speed of the motor 72 comprises conductor 85 which is tapped off conductor 74 and leads to the motor 81. From the motor 81, the conductor 86 leads to brush 87, which brush 87 is adapted to contact a metallic ring 88 on disk member 55. From the ring 88 a conductor 90 leads to terminal 57 (see Figures 3 and 4). When the resistance offered by the material being tested to the travel of the brush 11 is too little, then the torsion of the wire 32 will move the contact 60 into engagement with terminal 57. This of course will close a circuit and allow the current to flow from the conductor 74, through conductor 85 to reversing motor 81, conductor 86, brush 87, ring 88, conductor 90, terminal 57, contact 60 and bar 59, which bar constitutes a ground. This will cause the motor to rotate in the proper direction to actuate the rheostat 75 and the rheostat arm 76. The rheostat arm 76 will be moved in a clockwise direction in Figure 1, thereby lessening the resistance, and consequently speeding up the motor 72 so as to indicate a surface of greater smoothness than required by the initial torsion in the wire.

Also leading from the motor 81 is a conductor 92, which conductor is also connected to another brush 93 and this brush contacts a metallic ring 94 on insulation member 55. From the ring 94, a conductor 96 leads to terminal 58 (Figures 3 and 4) and this terminal is adapted to be engaged at times, by contact 61. For example, when the friction offered to the brush 11 becomes greater than prescribed by the initial torsion in the wire 32, then the terminal 58 will be contacted by the contact 61, thus allowing the current to flow through conductor 85, motor 81, conductor 92, brush 93, ring 94, conductor 96, terminal 58 and bar 59. This action will cause the motor to actuate the rheostat in the reverse manner, namely, to rotate the arm 76 in a counterclockwise manner in Figure 1 and thereby reduce the speed of the motor 72.

In order to indicate the shaft speed necessary to produce a given amount of torsion in the wire 32, a suitable indicating device 100 is provided. This indicating device comprises a hand 101 which is adapted to traverse a suitable scale 102. The indicator hand is driven by a vertically disposed shaft 103, which shaft has a pulley 104 on its lower end, upon which a belt 105 is mounted. This belt is also mounted upon the pulley 106 on shaft 67. It will be noted that the scale 102 is graduated from "100" on down to "0," the graduation mark "100" representing a highly polished surface, and the graduation mark "0" representing a comparatively rough surface. The hand 100 normally points to the numeral 100 on the scale but as the resistance to the brush decreases the speed will automatically be increased, thereby rotating hand 101 clockwise to indicate a less highly polished surface, and vice versa. The scale 102 thus represents units of resistance or drag. Of course, it is understood that when the contacts 60 and 61 are perfectly balanced, as shown in Figure 6, and not contacting either of the terminals 67 or 68, the reversible motor 81 remains idle, but when one of the contacts is made, the motor 81 will rotate in the proper direction to thereby reduce or increase the speed of the motor 72 accordingly. This device in combination with the indicating mechanism provides means whereby the torsion created in the wire will indicate the resistance offered in terms of revolutions per minute of the shaft 15.

Figure 7 shows a slightly modified form of the invention in which the device is applied to a different material, and also a slightly different method of operation is employed. It is here seen that a tank or vat 107 has an intake pipe 107a leading thereinto and an output pipe 107b leading therefrom. These pipes are adapted to cause a fluid 108 to flow through the vat. It is often necessary to have means for testing a fluid as it flows from one source to another so as to properly indicate a substantially constant consistency or viscosity. Immersed in the fluid 108, a slightly different type of testing tool 109 is provided. This testing tool may be characterized as a type of agitator which is mounted on the lower end of a shaft 110. The shaft 110 is driven by a collar 28 previously described, and also by a torsion wire mechanism similar to that shown in Figures 1 to 6 inclusive. If the consistency or viscosity of the fluid is constant, the bar 59 is perfectly balanced so that the terminals 60 and 61 will not engage either of the terminals 57 or 58. On the other hand if the consistency or viscosity becomes greater, then the resistance offered by the fluid to the agitator 109 will produce additional torsion in wire 32 thereby causing the contact 61 to engage the terminal 58 which, in turn, will cause a circuit to be closed. This circuit comprises conductor 96, ring 94, brush 93, conductor 112, bulb 113, conductor 114, battery 115, and ground 116. In other words, the bulb or lamp 113 will be illuminated which will show the operator that the consistency or viscosity of the fluid has increased. On the other hand if the consistency or viscosity decreases, then the contact 60 will move into engagement with terminal 57, and a circuit comprising conductor 90, ring 88, brush 87, conductor 118, bulb or lamp 119, conductor 114, battery 115 and ground 116 will be closed, thereby causing the lamp 119 to be illuminated which will tell the operator that the consistency or viscosity of the fluid has decreased. In this form of the invention, the rheostat arm 76 and the rheostat 75 must be varied manually so that the speed of the motor can be reduced to the proper rate where the indicator 100 will give a proper reading of consistency or viscosity in terms of the shaft speed.

If desired, the agitator 109 and its associated shaft 110 could replace members 11 to 19 inclusive in Figure 1, if automatic control of the rheostat 75 is desired, when using the device as a consistency or viscosity tester.

In the drawings and specification, there has been set forth a preferred embodiment of the invention, and although specific terms are employed, they are used in a generic and descriptive sense only and not for purposes of limitation, the scope of the invention being set forth in the appended claims.

I claim:

1. Apparatus for testing materials comprising a rotary testing member for contacting the material, an elongated torsional wire of predetermined length connected to one end of the member, a motor having a driving connection with the other end of said wire for continuously rotating the wire and the member thereon, an indicator for indicating the speed of the motor and means controlled by the torsion produced in the wire by the drag on the testing member for regulating the speed of the motor.

2. Apparatus for testing materials comprising a rotary testing member for contacting the material, an elongated resilient wire of predetermined length secured at one end to the member, a motor having a driving connection with the other end of the elongated wire for imparting continuous rotation thereto, an indicator for indicating the speed of the motor, means controlled by the torsion produced in the wire on account of the resistance offered by the material to the rotation of the member for regulating the speed of the motor and means for varying the initial torsion in said wire.

3. Apparatus for testing a material comprising a rotary tool for contacting the material, a torsion wire connected at its lower end to the tool, a driven member connected to the upper end of the wire, an electric motor for driving the driven member, an indicator for indicating the revolutions per minute of the motor, a circuit for the motor, a switch jointly carried by the driven member and the torsion wire, a variable resistance in the motor circuit, a reversible electric motor for operating the variable resistance, a circuit for the reversible motor, brushes in said reversible motor circuit and contacting said switch to increase the resistance in the variable resistance to lower the speed of the motor driving the driven member when the resistance to the testing tool increases and to decrease the resistance in the variable resistance if the resistance to rotation of the testing tool decreases to thereby cause the revolutions per minute of the first motor to serve as an indicator for the amount of drag experienced by the tool.

4. Apparatus for testing the drag offered to a rotary testing tool by a material comprising an electric motor, a torsion wire having a testing tool secured to one of its ends, a driving connection between the other end of the wire and the motor, an indicator for indicating the speed of the motor, means for indicating the initial torsion present in the wire before rotation is imparted thereto, means carried by the wire and the driving connection for decreasing the revolutions per minute of the motor when the drag on the testing tool increases and for increasing the revolutions per minute of the motor when the drag on the testing tool decreases to cause the revolutions per minute of the motor to be governed by the drag on the testing tool and to indicate the amount of resistance present in the material being tested.

5. Apparatus for testing material to determine the amount of resistance offered to a tool rotating in contact therewith comprising, an electric motor, a sleeve driven by the motor, a torsion wire having its upper end connected to the upper portion of the sleeve, a testing tool carried by the lower end of the wire and adapted to contact the material to be tested, a switch arm carried by the torsion wire, a double contact switch carried by the sleeve, a rheostat for controlling current to the electric motor, a circuit through said switch and switch arm, means in the circuit for increasing or decreasing the current to the motor, an indicator for indicating the speed of the motor through said rheostat to regulate the revolutions per minute in the motor in proportion to the amount of drag on the testing tool.

6. Apparatus for testing material to determine the amount of resistance offered to a tool rotating in contact therewith comprising a motor driven sleeve, a torsion wire secured at its upper end to the upper end of the sleeve, a testing tool on the lower end of the wire for contacting the material to be tested, means for placing the torsion wire under an initial torsion, a contact arm carried by the wire, a switch carried by the sleeve and having a pair of contacts disposed on opposite sides of the contact arm, a circuit through the switch and contact arm, the contact arm, due to the setting of the initial torsion in the wire, being normally out of contact with both of the contacts carried by the sleeve when the sleeve is rotating, a pair of indicators in the circuit, one of the indicators being adapted to be energized when the drag on the tool increases to cause the contact arm to engage one of the contacts and the other indicator being adapted to be energized when the drag on the tool decreases to cause the arm to engage the other contact.

JOHN M. BELL.